US010181956B2

(12) United States Patent
Jeansonne et al.

(10) Patent No.: US 10,181,956 B2
(45) Date of Patent: Jan. 15, 2019

(54) KEY REVOCATION

(71) Applicant: Hewlett-Packard Development Company, L.P., Houston, TX (US)

(72) Inventors: Jeffrey K. Jeansonne, Houston, TX (US); Lan Wang, Cypress, TX (US); Dallas M. Barlow, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 14/976,987

(22) Filed: Dec. 21, 2015

(65) Prior Publication Data

US 2017/0180139 A1 Jun. 22, 2017

(51) Int. Cl.
*H04L 9/32* (2006.01)

(52) U.S. Cl.
CPC .......... *H04L 9/3268* (2013.01); *H04L 9/3236* (2013.01); *H04L 9/3247* (2013.01)

(58) Field of Classification Search
CPC .................................................... H04L 9/3268
USPC ......................................................... 713/158
See application file for complete search history.

(56) References Cited

U.S. PATENT DOCUMENTS

| 7,243,240 | B2  |   | 7/2007  | Wang              |             |
|-----------|-----|---|---------|-------------------|-------------|
| 8,122,244 | B2  |   | 2/2012  | Azema et al.      |             |
| 8,571,993 | B2  |   | 10/2013 | Kocher et al.     |             |
| 8,850,177 | B2  | * | 9/2014  | Brown ............ | G06F 21/575 |
|           |     |   |         |                   | 713/2       |
| 8,856,771 | B2  |   | 10/2014 | Chalmers et al.   |             |
| 8,984,265 | B2  | * | 3/2015  | Vaid ............. | G06F 21/575 |
|           |     |   |         |                   | 380/277     |
| 2004/0193441 | A1 | * | 9/2004 | Altieri ......... | G06Q 30/02  |
|           |     |   |         |                   | 709/203     |
| 2006/0143600 | A1 |   | 6/2006 | Cottrell et al.  |             |
| 2007/0079112 | A1 | * | 4/2007 | Lewis ........... | G06F 21/575 |
|           |     |   |         |                   | 713/2       |
| 2008/0148001 | A1 | * | 6/2008 | Gehrmann ........ | G06F 21/57  |
|           |     |   |         |                   | 711/164     |
| 2008/0310370 | A1 | * | 12/2008 | Kitani .......... | H04W 48/18  |
|           |     |   |         |                   | 370/331     |
| 2009/0327741 | A1 | * | 12/2009 | Zimmer .......... | G06F 21/575 |
|           |     |   |         |                   | 713/183     |
| 2011/0225409 | A1 | * | 9/2011  | Sibert ........... | G06F 21/575 |
|           |     |   |         |                   | 713/2       |
| 2012/0167205 | A1 |   | 6/2012 | Ghetie et al.    |             |

(Continued)

OTHER PUBLICATIONS

Manan, Vishal, et al., "Windows 8.1 Secure Boot Key Creation and Management Guidance", May 6, 2014, 14 pages.

*Primary Examiner* — Khalil Naghdali
(74) *Attorney, Agent, or Firm* — Brooks, Cameron & Huebsch

(57) ABSTRACT

Example implementations relate to key revocation. For example, a system for key revocation may comprise a processor, an embedded controller, a non-volatile memory storing a system instruction signing key authorization data element, wherein the data element includes a system instruction signing key, a signing key number and a signature. The embedded controller may include a plurality of keys to verify the data element, and a one-time programmable (OTP) memory and a key among the plurality of keys that is revocable using the OTP memory, wherein revocation of the key permanently prevents the embedded controller from utilizing the key.

15 Claims, 4 Drawing Sheets

(56) References Cited

U.S. PATENT DOCUMENTS

2013/0346747 A1* 12/2013 Ignatchenko ......... H04L 9/3268
　　　　　　　　　　　　　　　　　　　713/158
2017/0039352 A1* 2/2017 Volkening ............... G06F 21/57
2017/0093586 A1* 3/2017 Miranda ............... H04L 9/3263

* cited by examiner

KEY REVOCATION

BACKGROUND

Computing systems have basic input/output system (BIOS). The BIOS is a set of software routines that configure hardware at startup, starts the operating system, provides an abstraction layer to the operating system to enable consistent access to hardware and firmware capabilities and supports the transfer of data among hardware devices. The BIOS routines can be stored on a non-volatile storage such as a read only memory, a programmable read only memory, erasable programmable read only memory, flash memory or another non-volatile memory.

DETAILED DESCRIPTION

Figure 1:
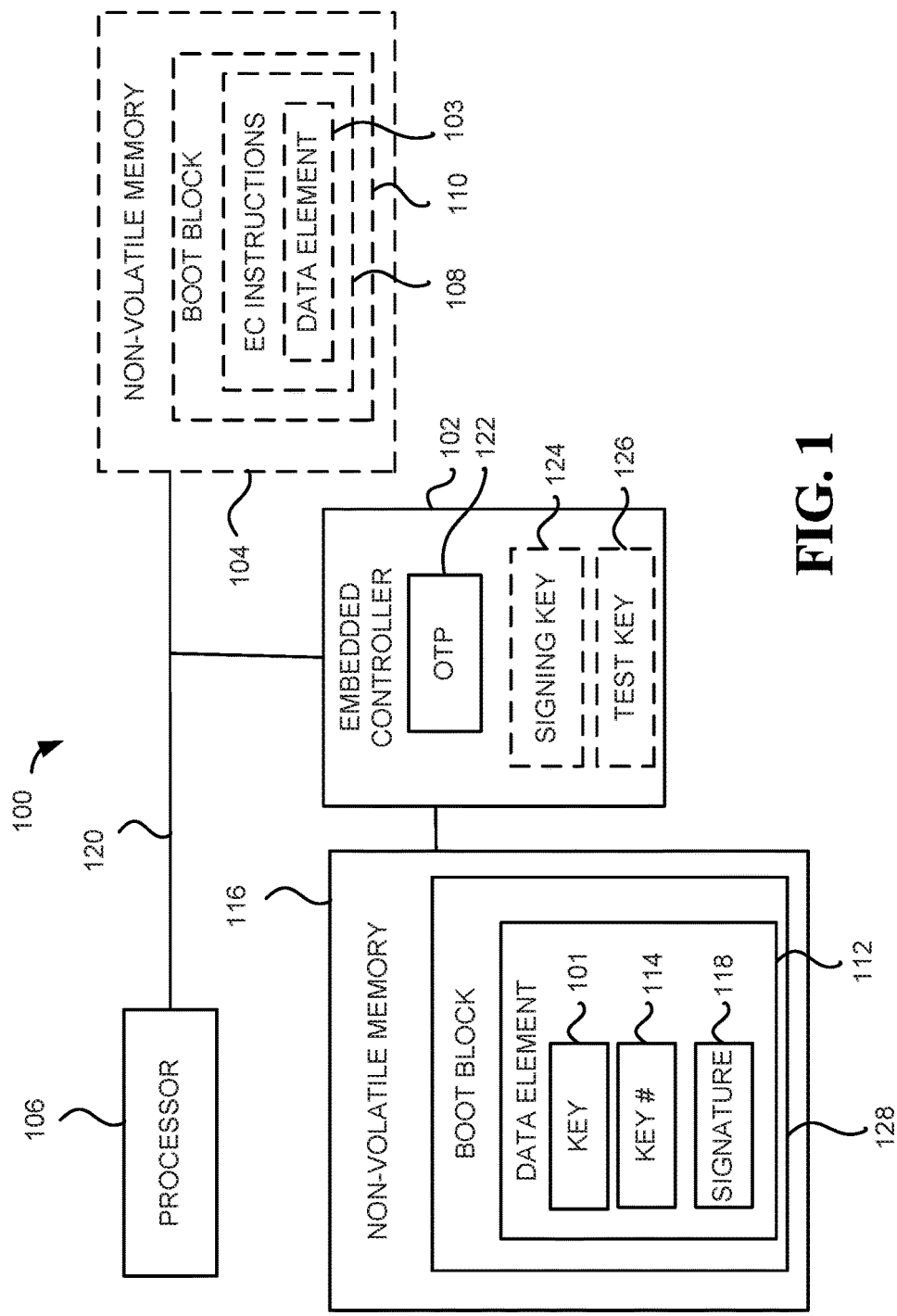
FIG. 1 illustrates an example computing system for key revocation according to the present disclosure.

Malware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or unintentionally.

Although a protection mechanism can be provided in a computing system to protect the system code, such protection mechanism may become compromised under certain conditions, which can subject the system code to malware attacks.

System code used to perform startup of a computing system can include system firmware (also referred to herein as "system instructions"), which can be in the form of machine-readable instructions executable on a processor (or processors) of the computing system. "System firmware" can refer to any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. Once system firmware in a non-volatile memory is compromised, one possible remediation may involve physically replacing a component that includes the non-volatile memory. Such a technique of addressing compromised system firmware can be labor intensive, costly, and time-consuming.

Some verification processes may include the use of cryptographic-based verification techniques. For example, the verification may employ cryptographic encryption using public and private keys. As used herein, a public key refers to a key that is known to multiple entities, and a private key refers to a key that is only known to a single entity or a limited number of entities. Data encrypted with a private key may be decrypted using the corresponding public key. Similarly, data may be encrypted using the private key, but decrypted using the public key. This underlying concept may be used in digital signature generation and verification. However, such general techniques do not protect against complex security attacks such as replacement attacks. A replacement attack refers to a security attack during which an unauthorized entity has substituted the public key with one corresponding to their private key or a private key that they can access. In such replacement attacks, the public key will automatically verify a signature associated with the attacker's private key, because the private key is perceived to have originated from a trusted source. To protect against a replacement attack, the public key used for digital signature verification may be integrated into the hardware. However, merely integrating a public key into hardware does not enable development activities with a different public key whose corresponding private key is loosely controlled (versus the production public key with a tightly controlled corresponding private key) without added security risk. In contrast, key revocation according to the present disclosure enables development activities which involve authorizing firmware by generation of a digital signature with a loosely protected and widely distributed key without exposing any possibility of running that development firmware on a production platform.

FIG. 1 illustrates an example computing system 100 for key revocation according to the present disclosure. As illustrated in FIG. 1, the system 100 may include an embedded controller 102, a shared non-volatile memory 104, a processor 106, and a private non-volatile memory 116. The shared non-volatile memory 104 is "shared" in the sense that it is accessible by multiple entities, including the embedded controller (EC) 102 and at least one other entity (including the processor 106). The private nonvolatile memory 116 is accessible by the embedded controller 102, but is inaccessible to the processor 106 or to other components in the computing system 100. Making the private non-volatile memory 116 inaccessible to the processor 106 and other components protects the content of the private non-volatile memory 116 from unauthorized tampering via the processor. The private non-volatile memory 116 is accessible by the embedded controller 102 at all times. Although not shown in FIG. 1, an input/output (I/O) controller may be provided between the processor 106 and the shared non-volatile memory 104.

The private non-volatile memory 116 can be physically separate from the shared non-volatile memory 104 (such as implemented in different physical memory devices). Similarly, the private non-volatile memory 116 and the shared nonvolatile memory 104 can physically reside on a common memory device, but the shared non-volatile memory 104 and the private non-volatile memory 116 are in different segments of the physical memory device, where the segment of the physical memory device that contains the private non-volatile memory 116 is accessible by only the embedded controller 102. The private non-volatile memory may store a boot block 128 of BIOS code, and system instruction signing key authorization data element 112, where the data element includes a system instruction signing key 101, a signing key number 114 and a signature 118, as discussed further herein.

The shared non-volatile memory 104 may be accessible over a shared bus 120 by the embedded controller 102 or by another entity. In some implementations, just one entity can have access to the shared bus 120 at any given time, such that just one entity can access the shared non-volatile memory 104 at a time. In some examples, the shared bus 120 is a shared Serial Peripheral Interface (SPI) bus. An SPI bus is a synchronous serial data link in which devices on the SPI bus operate in a master-slave mode. In other examples, another type of shared bus 120 can be used. For example, an enhanced serial peripheral interface (eSPI) bus may be used.

The shared non-volatile memory 104 can store system instructions, which can include BIOS code. The BIOS code may include embedded controller instructions 108 that are for execution by the embedded controller 102, and a boot block 110 that is to be executed by the processor 106. The embedded controller instructions 108 may refer to any machine-readable instructions executable in the embedded controller 102. Also, the embedded controller instructions 108 may be application software that may be in the form of machine-readable instructions.

As illustrated in FIG. 1, the embedded controller instructions 108 may be included in the boot block 110 of the system instructions. Including the embedded controller instructions 108 inside the boot block 110 may provide an indication that the embedded controller instructions 108 have been signed by the entity that provided the system instructions, which may be the vendor of the computing system 100, or another entity. In other examples, the embedded controller instructions 108 may be separate from the boot block 110.

The boot block 110 may be a part of the BIOS instructions, and may be first executed when the computing system 100 starts up. Put another way, the boot block 110 may be executed first before the rest of the BIOS instructions are allowed to execute. The boot block 110 may be used to check the integrity of the BIOS code as well as to perform other initial functions. If the boot block 110 confirms the integrity of the BIOS code, then the boot block 110 may pass control to the main portion of the BIOS code for initiating the remaining operations associated with the BIOS code.

In some examples, the boot block 110 may include core root of trust for measurement (CRTM) logic, which is logic specified by the Trusted Computing Group (TCG), an industry standard work group. During a power on procedure of the computing system 100, the CRTM logic can perform certain initialization tasks and can make a number of measurements that are stored for later use.

In accordance with examples of the present disclosure, an embedded controller 102 may verify the provider of the CRTM prior to initialization of the remaining system instructions. The embedded controller 102 may be physically separate from the processor 106 of the computing system 100. The processor 106 may be used for executing the operating system (OS), application code, and/or other code in the system 100. The embedded controller 102, on the other hand, may be used to perform specific predefined tasks, as programmed into the embedded controller instructions 108. The embedded controller 102 may be implemented with a microcontroller, an application specific integrated circuit (ASIC), a programmable gate array (PGA), or any other type of programmable circuit.

The embedded controller 102 may include a plurality of components. For example, the embedded controller may include a plurality of keys 124, 126, to verify the data element, and a one-time programmable (OTP) memory 122. As used herein, an OTP memory refers to a form of read-only memory (ROM) where the setting of each bit is locked by a fuse or antifuse. As described further herein, the OTP memory 122 may be used to permanently revoke the root test key 126 at the hardware level before the computing system 100 is released by the manufacturer for use. Further, the embedded controller 102 may also include a boot loader (not illustrated in FIG. 1) that verifies the signature with a BIOS signing key, using the OTP. The embedded controller 102 may also include access to locked OTP bits, which identify locked BIOS keys. Put another way, the OTP memory 122 may include a bank of system key revocation bits, including lock OTP bits and neverlock OTP bits. The ROM of the embedded controller 102 may use these lock OTP bits and neverlock OTP bits to determine how to validate system instructions for both the embedded controller and BIOS and/or indicate platform hardware state to the embedded controller and BIOS.

Further, the embedded controller 102 may include a plurality of keys. For instance, the embedded controller may include two keys, a system instruction signing root key 124 and a system root test key 126. Both the system instruction signing root key 124 and the system root test key 126 may be valid for checking the digital signature 118 of the system instruction signing key authorization data element. The system instruction signing root key 124, as used herein, refers to the key (public key) used to perform verification of the system instruction key, such as by verifying the system instruction key number 114 and the signature 118 of the system instruction signing key authorization data element 112. The system instruction signing root key 124 may be the public portion of a signing key, to which the private key is matched. The system root test key 126, refers to the key (public key) that may also be used to perform verification of the system instruction signing key authorization data element 112 when the platform is in a particular state. As described herein, before customer use of the system 100, the system root test key 126 may be revoked such that pre-production code will not be validated and therefore never executed on the computing device 100 after such revocation. Put another way, the system instruction root signing key 124 may be used to validate the system instruction signing key authorization data element 112, which contains the system instruction key that may subsequently be used to validate all embedded controller instructions and BIOS boot block instructions.

The embedded controller 102 may verify the signature 118 and the system instruction signing key number 114 using the OTP memory 122, as discussed further herein. In some examples, the embedded controller may verify the signature 118 and the system instruction signing key number 114 prior to startup of the processor 106, although examples are not so limited, and the embedded controller may verify the signature 118 and the system instruction signing key number 114 during runtime of the system 100. Similarly, the embedded controller 102 may include a boot loader to authorize the system instruction signing key by verifying the signature of the data element 112.

The computing system 100 also includes the private non-volatile memory 116, which stores a system instructions copy (not illustrated in FIG. 1), where the system instructions copy includes a boot block 128 and an embedded controller instructions (not illustrated in FIG. 1). The system instructions copy in the private non-volatile memory 116 can be a duplicate of the system instructions (not illustrated in FIG. 1) in the shared non-volatile memory 104. Alternatively, the system instructions copy may be a different version (later version or earlier version) than the system instructions.

In some implementations, the embedded controller 102 can first attempt to use the embedded controller instructions in the private non-volatile memory 116 during a restart of the computing system 100. If the embedded controller 102 is unable to successfully use the embedded controller instructions, then the embedded controller 102 can use the embedded controller instructions in the shared non-volatile memory 104 in an attempt to start the computing system 100. If the embedded controller 102 is unable to start the system using either of the embedded controller instructions, then an error has occurred, which is likely due to compromise of both copies of the embedded controller instructions.

Although reference is made to first attempting to use the embedded controller instructions in the private non-volatile memory 116 before attempting to use the embedded controller instructions in the shared non-volatile memory 104, different implementations can first attempt to use the embedded controller instructions in the shared non-volatile memory 104 before attempting to use the embedded controller instructions in the private non-volatile memory 116. In other examples, embedded controller firmware (or a portion thereof) can be embedded in the embedded controller 102. The embedded controller instructions embedded in the embedded controller 102 may be immutable.

As described herein, the embedded controller 102 may verify the embedded controller instructions on the private non-volatile memory 116. Verifying a piece of code, such as the embedded controller firmware, can refer to cryptographically validating that the piece of code has not been changed and/or confirming that the piece of code is from a trusted source. In addition, once the embedded controller instructions are verified and loaded for execution on the embedded controller 102, the embedded controller instructions may verify system instructions prior to each restarted execution of the system instructions by the processor 106, such as due to a cold reset of the computing system 100, a resume from a low power state of the computing system 100, an operating system restart, and so forth. It is noted that the system instructions can also be verified by the embedded controller instructions each time the computing system 100 enters a low power state. In other examples, the embedded controller instructions can also verify the system instructions when the processor 106 remains powered.

In other implementations, the embedded controller instructions may perform the verification at any time, even when the computing system is not in a low power state. For example, the embedded controller instructions may perform the verification when the processor 106 is idle or not accessing the shared non-volatile memory 104. The verification by the embedded controller instructions can also be performed in "real-time," as the system instructions are retrieved for execution by the processor.

Figure 2:
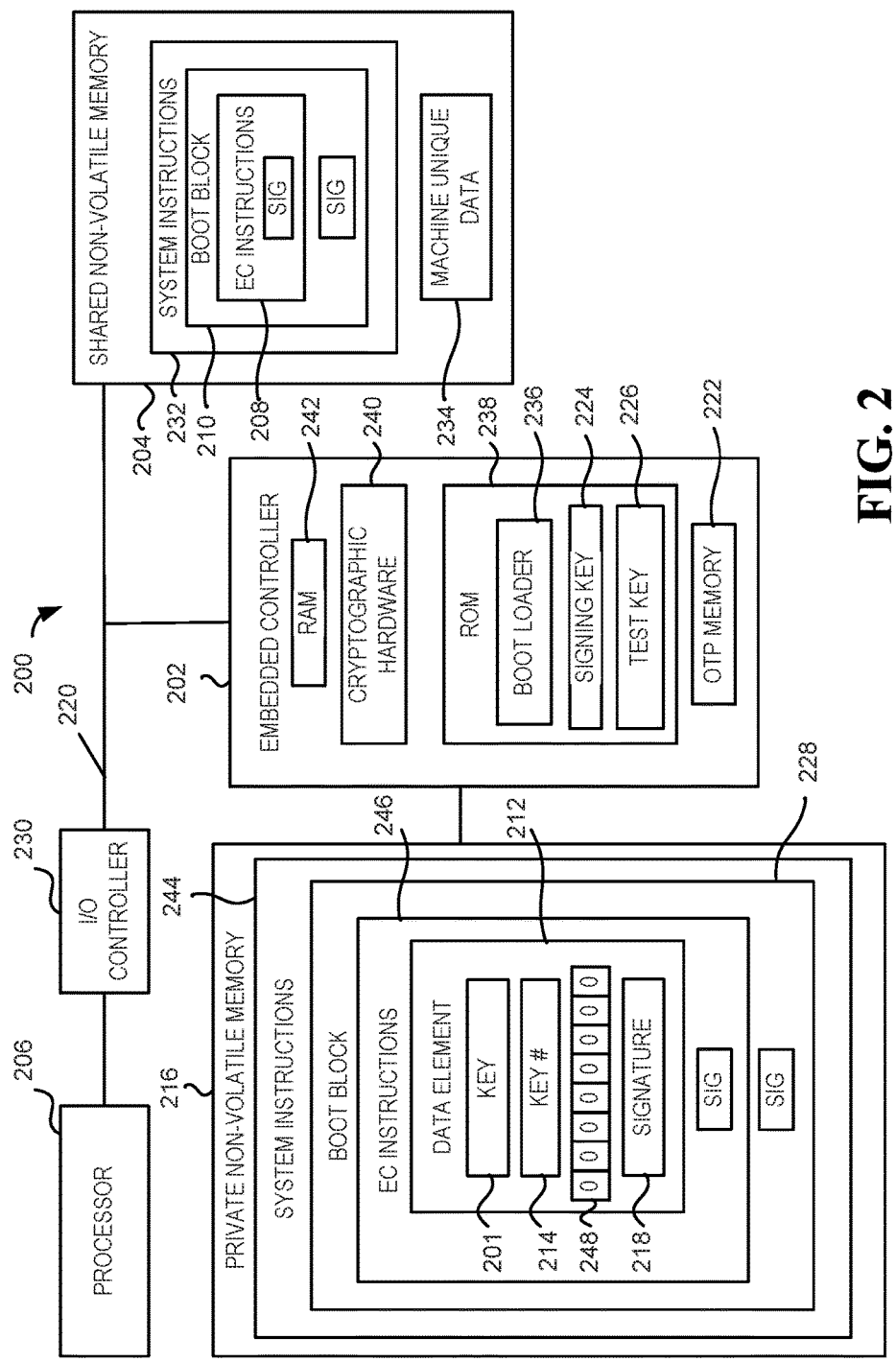
FIG. 2 further illustrates an example computing system for key revocation according to the present disclosure.

FIG. 2 further illustrates an example computing system for key revocation according to the present disclosure. The computing system 200 of FIG. 2 includes an input/output (I/O) controller 230, which is connected between the processor 206 and the shared bus 220. In some examples, the I/O controller 230 can be a Platform Controller Hub (PCH). The PCH can include various functions, including a display interface to a graphics subsystem, a system bus interface to a system bus to which various I/O devices can be connected, and so forth. In other examples, other types of I/O controllers can be used.

As illustrated in FIG. 2, the embedded controller 202 also includes cryptographic hardware 240, which can perform cryptographic computations, such as those used in the verifying of the embedded controller instructions 208, 246 and the boot block 210, 228. The cryptographic hardware 240 can be in the form of circuitry that is configured to perform cryptographic computations. The cryptographic hardware 240 may be any electronic, magnetic, optical, or other physical storage device that stores executable instructions. Thus, the cryptographic hardware 240 may be, for example, Random Access Memory (RAM), an Electrically-Erasable Programmable Read-Only Memory (EEPROM), a storage drive, an optical disc, and the like. As such, the cryptographic hardware may be a machine-readable storage medium that can execute instructions to perform cryptographic computations.

The embedded controller 202 further includes a read-only memory (ROM) 238, which can be used to store a boot loader 236 and a system instruction root signing key 224 and a system root test key 226. The system instruction root signing key 224 can be the key (public key) used to perform verification of the system instruction signing key authorization data element 212 and thus the system instruction signing key 201. Embedded controller instructions. During system startup, the boot loader 236 may be loaded from the ROM 238 to execute in the embedded controller 202 to retrieve embedded controller instructions from the private or shared non-volatile memory 216 or 204 into a random access memory (RAM) 242 of the embedded controller 202. The boot loader 236 may take steps to ensure that no other entity except the embedded controller 202 has access to the shared bus 220 during the embedded controller instructions load operation.

The embedded controller instructions may be verified using the boot loader 236 that is able to invoke the cryptographic hardware 240 to assist in performing cryptographic computations, as well as the OTP memory 222. The system instruction root signing key 224 may be burned into the ROM bootloader 236. The ROM bootloader 236 may validate the embedded controller instructions 246 and system instructions 244 stored in the private non-volatile memory 216. First, the ROM bootloader 236 may access the private non-volatile memory 216, and find the system instruction signing key authorization data element 212. The system instruction signing key authorization data element 212 includes the system instruction production public key 201. The system instruction signing key authorization data element containing the system instruction public key includes a digital signature 218. The bootloader 236 may verify that the digital signature 218 is valid. Next, the bootloader 236 may verify fields within the system instruction signing key authorization data element 212. For instance, the bootloader 236 may verify the system instruction key number 214. The bootloader 236 may verify if the system instruction production public key has a system instruction key number that has been revoked. As used herein, a system instruction key number refers to a number assigned to a particular system instructions signing key. Each system instruction signing key may have a different, unique system instruction signing key number. The system instruction key number 214 may be associated with the 8 bit mask of memory 248 stored in the OTP memory 222. The bootloader 236 may review the system instruction key number 214, and compare it to the OTP bit associated with that key number to determine validity. If the bootloader 236 verifies that the key associated with those system instruction key number 214 is a valid key, such that it has not been revoked, and if the bootloader 236 confirms that the signature 218 is valid, the system instruction key 201 is allowed. If the system instruction key 201 is allowed, the bootloader 236 may use the associated key to verify the signature of all of the other components in the private non-volatile memory. That is, the key is then used to verify the embedded controller instructions 246, and the system instructions 244.

In some examples, one of the bits in the OTP memory 222 may be changed to revoke the associated key. For instance, the manufacturer of the computing system 200 may revoke the system test key 226, and therefore change one of the bits associated with that key to permanently identify that key as a revoked key, or a permanently inaccessible key. In such examples, the bootloader 236 may identify the key as a revoked key, and the key cannot be used to verify any components. While revocation of the test 226 is provided as an example, examples are not so limited, and other keys such any system instruction key corresponding to a unique system instruction key number may be revoked by changing a bit in the OTP memory, for instance from a 0 (zero) to a 1 (one).

Developers of computing system 200 may use the system test key 226 for various development and testing purposes. However, the system test key 226 may be revoked such that testing and/or development code does not run on production platforms. As described herein, the ROM bootloader 236 may use either the system test key 226 or the system instruction signing key 224 to verify the embedded controller instructions 246. First, the bootloader 236 may attempt to verify the system instruction signing key authorization data element 212 using the system instruction signing key 224. If the bootloader 236 cannot verify the system instruction signing key authorization data element 212 using the system instruction signing key 224, then the bootloader 236 may attempt to verify the system instruction signing key authorization data element 212 using the system test key 226. However, as discussed above, the bootloader 236 may still verify whether the particular key is revoked, using the bits 248 and the corresponding OTP memory bits 222.

As described herein, the OTP 222 may include a lock bit and a neverlock bit. A lock bit, as used herein, refers to a bit that can signify whether the system test key 226 is locked, in other words revoked. In some examples, the lock bit may automatically change, e.g., from 0 to 1, after a specified amount of time. Additionally, the lock bit may be changed manually, such as by the developer using an unlocked computer system 200. Similarly, a neverlock bit, as used herein, refers to a bit within the OTP memory that can signify that the system test key 226 should not be automatically revoked. While examples herein describe the OTP memory as including 8 bits, examples are no so limited, and more or fewer bits than 8 may be used.

In the shared non-volatile memory 204, a signature may be associated with the embedded controller instructions 208, and a signature may be associated with the boot block 210.

Similarly, in the private non-volatile memory 216, a signature may be associated with the embedded controller instructions 246, and a signature may be associated with the boot block 228. The signatures may be used in the verification of the respective embedded controller instructions 208 or 246, while the signature is used in the verification of the respective boot block 210 or 228. Use of a signature in the verification process can allow a determination of the authenticity of the respective embedded controller instructions or boot block, and a determination that the respective embedded controller instructions or boot block has not been compromised.

In some examples, the verification of the embedded controller instructions 208 or 246 may be accomplished by decrypting the respective signature using the system instruction key 201 that was previously successfully validated by the embedded controller bootloader 236 using the system instruction signing key stored in the embedded controller ROM 238. Decrypting the signature produces a respective value (e.g. hash value) that can be compared with a corresponding calculated value (e.g. hash value) of the embedded controller instructions. If the foregoing values match, then the embedded controller instructions are verified. A similar process may be used for verifying the BIOS boot block 210 or 228 using the respective digital signature.

Figure 3:
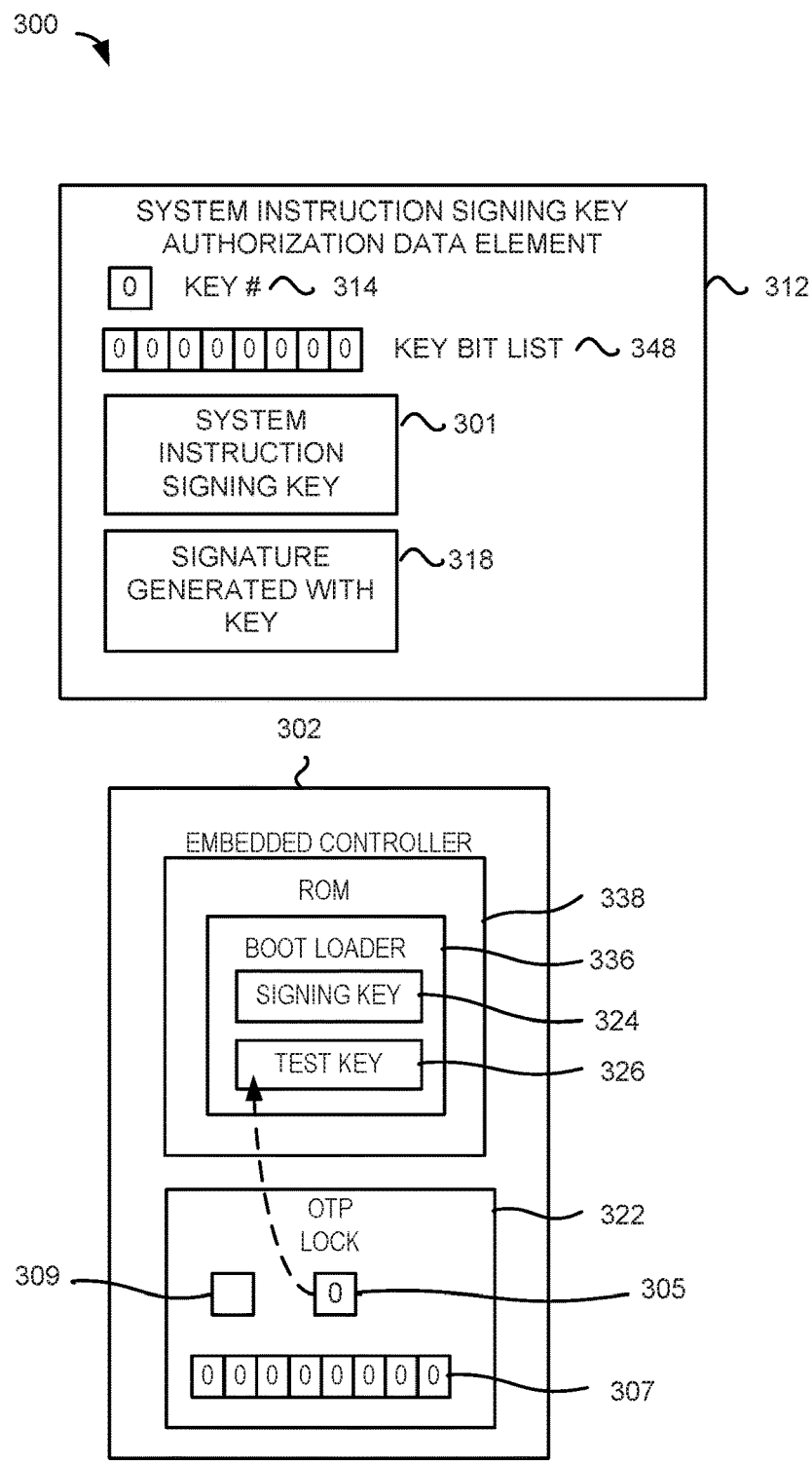
FIG. 3 illustrates a diagram of a portion of a system for key revocation according to the present disclosure.

FIG. 3 illustrates a diagram of a portion of a system 300 for test key revocation according to the present disclosure. As discussed in relation to FIGS. 1 and 2, the embedded controller header 302 may be compared to system instruction signing key authorization data element 312 stored in the private non-volatile memory (e.g., private non-volatile memory 116 as referenced in FIG. 1) that is coupled to the embedded controller 302. The system instruction signing key authorization data element 312 may include a key number 314, a key bit list 348, a system instruction signing public key 301, and a signature 318 generated with the private key corresponding to one of the plurality of system instruction root signing public keys 324, 326.

In some examples, the key bit list 348 can be a key bit mask that designates active keys and inactive keys that are stored within the embedded controller 302. The key bit list 348 illustrates a total of eight bits that can be utilized for activating or deactivating eight different system keys, however a fewer number of bits or a greater number of bits can be utilized.

The system instruction signing public key 301 may be utilized along with the system instruction signing root key 324 and test key 326 for a cryptographic-based verification technique. For example, the system instruction signing public key 301 can be authorized by validating the signature 318 using the system instruction signing root key 324 or the root test key 326 in a Rives, Shamar, and Adleman (RSA) verification technique. In all examples, the system instruction signing public key 301, the system instruction signing root key 324 and the root test key 326 may be well known to anyone and used to verify the authenticity of components that include a digital signature generated using the corresponding private key.

As described in relation to FIGS. 1 and 2, the embedded controller 302 may include an OTP memory 322. The OTP memory 322 may include a lock bit 305, a neverlock bit 309 and/or a key bit list 307. The lock bit 305 may be utilized to revoke the root test key 326 when the system is sent for production uses. For example, there can be instructions associated with the root test key 326 that a manufacturer may not want users who purchase the computing system to utilize. In this example, the root test key 326 can be permanently locked or revoked from being used when the value for the lock bit is "1".

The neverlock bit 309 may act as a flag, such that if instructions in the OTP memory 322 indicate that neverlock is set, the computing system will remain unlocked. Put another way, if the neverlock bit 309 is set, then both the system instruction signing root key 324 and the root test key 326 may be utilized to verify the system instruction signing public key 301. However, if the neverlock bit 309 is not set, then the root test key 326 may be revoked as soon as possible, for instance, within a threshold period of time. In some examples, the root test key 326 may be revoked manually, such as by actions taken by an administrator of the computing system. Regardless of the method by which the root test key 326 is revoked, it is permanently unavailable for use within the computing system, thereby preventing a user of the computing system from accessing the pre-production code of the computing system.

Figure 4:
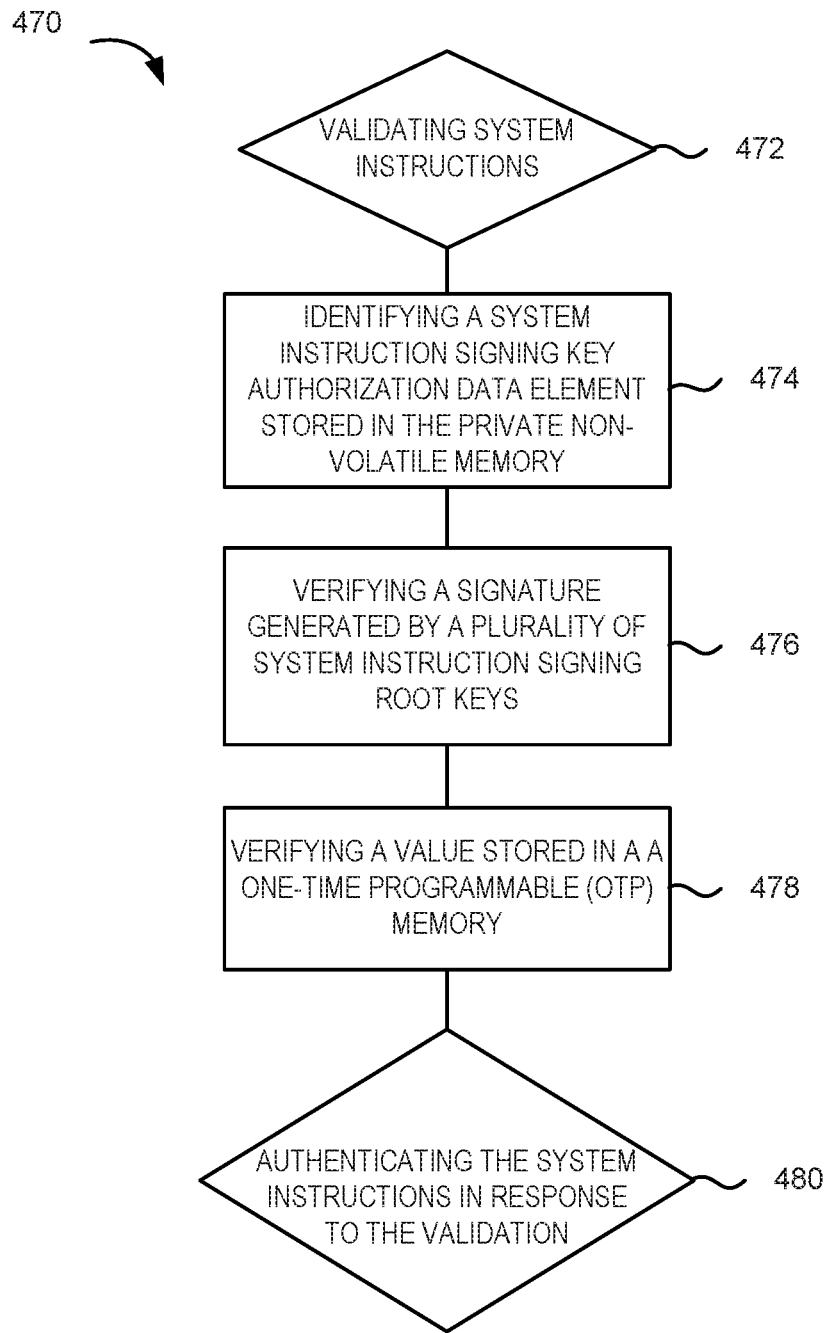
FIG. 4 illustrates an example method for key revocation according to the present disclosure.

FIG. 4 is an example method 470 for key revocation according to the present disclosure. As described in relation to FIGS. 1 and 2, the embedded controller (102 illustrated in FIG. 1 and 202 illustrated in FIG. 2) may perform verification operations. As illustrated in FIG. 4, the method 470 may include validating system instructions, at 472. For instance, the method 470 may include validating system instructions in a private non-volatile memory, as discussed in relation to FIGS. 1 and 2.

To validate the system and embedded controller instructions, the embedded controller may first execute embedded controller bootloader instructions (e.g., 234 illustrated in FIG. 2) of the embedded controller ROM. Next, at 474, the method 470 may include identifying, using a bootloader on the embedded controller, a system instruction signing key authorization data element stored in the private non-volatile memory. At 476, the method 470 may include verifying, using the bootloader, a signature stored in the system instruction signing key authorization data element that was generated by a private key, as discussed in relation to FIG. 2. The verification attempt performed in all cases using the root production system instruction public key 224 and in the event of a failure, may include an attempt to verify the signature using the root test system key 226 based on the stored value of a lock bit of an OTP memory, the lock bit associated with revocation of a test key, as discussed further herein.

If the embedded controller determines that the embedded controller instructions from the private non-volatile memory have been validated, then the embedded controller instructions may be executed by the embedded controller 102 to perform embedded controller initialization tasks.

However, if the embedded controller determines that the embedded controller instructions have not been successfully validated (such as due to compromise of the embedded controller instructions or for another reason), then the embedded controller may retrieve the embedded controller instructions from the shared non-volatile memory. The embedded controller may then perform the validation of the embedded controller instructions in the shared non-volatile memory. If the embedded controller instructions are successfully validated, then the embedded controller instructions may be executed by the embedded controller. However, if the embedded controller instructions are not verified by the embedded controller, then an error may be indicated, for instance on a user interface.

At 478, the method 470 may include verifying a value stored in a lock bit of an OTP memory. For instance, as described herein, the lock bit may be associated with revocation of a key among a plurality of keys for revocation of the data element.

At 480, the method 470 may include authenticating, using the embedded controller, the system instructions for access of a shared non-volatile memory by a processor, in response to the validation of the system instructions. For example, the embedded controller may validate the system instructions on the private non-volatile memory (e.g., 116 illustrated in FIG. 1), before the full BIOS is executed and before the processor may access the shared non-volatile memory (e.g., 104 illustrated in FIG. 1). After validation of the embedded controller instructions, the embedded controller instructions can be loaded into the embedded controller for execution. In response to validating the embedded controller instructions, the validation process can further validate system boot code in the non-volatile memory. The system boot code that is validated can include the boot block. More generally, the system boot code can refer to any system code that is used to boot the computing system 100 or to resume the computing system 100 from a low power state.

If the system boot code is validated, then the computing system 100 may be ready to boot. If one of the boot blocks (e.g., one of 210 and 228) cannot be validated, then the embedded controller instructions may use one of the boot blocks 210 and 228 to fix the other of the boot blocks 210 and 228. The boot block 210 can then be retrieved from the shared non-volatile memory and loaded to the processor for execution.

In some examples, verifying the value stored in the lock bit includes determining the root test key has been permanently revoked. For instance, the fuse associated with the root test key may be permanently broken, rendering it unusable. For example, as discussed in relation to FIG. 3, the value of the lock bit associated with the key may be changed, either automatically or manually, to indicate that the key is permanently inaccessible. In other words, the locked key is revoked and may not be used again. Similarly, the method may include determining whether the root test key corresponds to a neverlock bit. For example, the embedded controller may determine that a neverlock bit corresponding to the root test key has been set. As such, the root test key will not automatically lock. Put another way, by setting a neverlock bit in the OTP using the embedded controller, the computing system may perform like a lab unit and the key will not be automatically locked. If the neverlock bit is not set, then the key is locked as early as possible in the manufacturing process so that the computing system may perform like a production unit.

Further, the method may include attempting to validate system and embedded controller instructions using a system instruction signing root key, optionally a system instruction signing root test key, and if neither work, then determining that the signature provided was generated using an invalid key or the system and/or embedded controller instructions were modified in an unauthorized manner.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

What is claimed:

1. A system for key revocation comprising:
a processor;
an embedded controller;
a non-volatile memory storing a system instruction signing key authorization data element, wherein the data element includes a system instruction signing key, a signing key number and a signature; and
the embedded controller including:
a plurality of root keys to verify the data element; and
a one-time programmable (OTP) memory and a key among the plurality of root keys that is revocable using the OTP memory, the OTP memory including a neverlock bit, wherein:
revocation of the key permanently prevents the embedded controller from utilizing the key, wherein the revocation is performed by breaking a fuse associated with the key; and
the key is automatically revoked within a threshold period of time from a verification unless a neverlock bit is verified to be set such that revocation of the key is prevented.

2. The system of claim 1, wherein the embedded controller further includes a boot loader to authorize the system instruction signing key by verifying the signature of the data element.

3. The system of claim 1, wherein the embedded controller authorizes the system instruction signing key using a key among the plurality of root keys and by verifying the signature in the data element.

4. The system of claim 1, wherein the embedded controller includes a lock bit to revoke a key among the plurality of root keys.

5. The system of claim 1, wherein the data element includes a public portion of a system signing key; and
wherein the embedded controller verifies the signature and the signing key number prior to startup of the processor.

6. The system of claim 1, further comprising the embedded controller to permanently revoke access to a key among the plurality of root keys responsive to modification of a lock bit in the OTP memory.

7. The system of claim 1, wherein the embedded controller includes access to a plurality of locked OTP bits, wherein a locked OTP bit identifies a key among the plurality of root keys that is permanently revoked.

8. The system of claim 1, wherein the OTP memory includes a lock bit indicating whether the key is permanently revoked, and wherein the embedded controller is to automatically change, after a specified amount of time, a value of the lock bit to permanently revoke the key.

9. A method of key revocation comprising:
validating system instructions in a private non-volatile memory by:
identifying, using a bootloader on an embedded controller, a system instruction signing key authorization data element stored in the private non-volatile memory;
verifying, using the bootloader, a signature generated by a plurality of system instruction signing root keys and stored in the data element; and
verifying a value of a neverlock bit stored in a one-time programmable (OTP) memory, the value associated with prevent permanent revocation of a key among a plurality of root keys for verification of the data element, wherein:
the key is permanently and automatically revoked within a threshold period of time of the verification unless the value is determined to be set; and
the key is permanently revoked by breaking a fuse associated with the key; and
authenticating the system instructions for access of a shared non-volatile memory by a processor, in response to the validation of the system instructions.

10. The method of claim 9, wherein verifying the value stored in the OTP memory includes determining the key has been permanently revoked.

11. The method of claim 9, wherein validating system instructions in the private non-volatile memory includes attempting to validate a system instruction signing key and a test key, and if neither work, then determining that the signature is invalid.

12. A non-transitory computer readable medium storing instructions executable by an embedded controller to:
validate system instructions in a private non-volatile memory by:
identifying, using a bootloader on an embedded controller, a system instruction signing key authorization data element stored in the private non-volatile memory;
verifying, using the bootloader, a signature by a system instruction signing key and stored in the data element;
verifying, using the bootloader, a key number in the data element using a value stored in the OTP memory and associated with revocation of a test key, wherein:
permanent revocation of the test key is automatically performed unless a neverlock bit stored in the OTP memory indicates a prevention of the automatic revocation; and
the test key is permanently revoked by breaking a fuse associated with the key to permanently revoke the key; and
authenticate the system instructions for access of a shared non-volatile memory by a processor, in response to the validation of the system instructions.

13. The non-transitory computer readable medium of claim 12, further including the embedded controller to permanently revoke the test key by receiving a modification of the OTP memory.

14. The non-transitory computer readable medium of claim 13, further including the embedded controller to invalidate the system instructions in response to determining that the key number corresponds to a revoked key.

15. The method of claim 12, wherein the permanent revocation is automatically performed within a threshold period of time.

* * * * *

UNITED STATES PATENT AND TRADEMARK OFFICE
CERTIFICATE OF CORRECTION

PATENT NO. : 10,181,956 B2
APPLICATION NO. : 14/976987
DATED : January 15, 2019
INVENTOR(S) : Jeffrey K. Jeansonne et al.

It is certified that error appears in the above-identified patent and that said Letters Patent is hereby corrected as shown below:

In the Drawings

In sheet 4 of 4, FIG. 4, reference numeral 478, Line 1, after "A" delete "A".

Signed and Sealed this
Thirtieth Day of April, 2019

Andrei Iancu
*Director of the United States Patent and Trademark Office*